US009039256B2

(12) United States Patent
Kung

(10) Patent No.: US 9,039,256 B2
(45) Date of Patent: May 26, 2015

(54) LED LAMP WITH COVER HAVING THROUGH HOLES

(71) Applicant: HON HAI PRECISION INDUSTRY CO., LTD., New Taipei (TW)

(72) Inventor: Te-Yuan Kung, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 13/971,855

(22) Filed: Aug. 21, 2013

(65) Prior Publication Data

US 2014/0292182 A1 Oct. 2, 2014

(30) Foreign Application Priority Data

Mar. 26, 2013 (CN) ........................ 2013 1 00973853

(51) Int. Cl.

| | |
|---|---|
| ***B60Q 1/06*** | (2006.01) |
| ***F21V 29/00*** | (2006.01) |
| ***F21K 99/00*** | (2010.01) |
| ***F21V 3/00*** | (2006.01) |
| ***F21V 3/02*** | (2006.01) |
| ***F21V 11/14*** | (2006.01) |
| *F21V 3/04* | (2006.01) |
| *F21V 23/00* | (2006.01) |
| *F21Y 101/02* | (2006.01) |

(52) U.S. Cl.

CPC ................. *F21K 9/1355* (2013.01); *F21K 9/50* (2013.01); *F21K 9/90* (2013.01); *F21V 3/005* (2013.01); *F21V 3/02* (2013.01); *F21V 3/0409* (2013.01); *F21V 11/14* (2013.01); *F21V 23/002* (2013.01); *F21V 23/006* (2013.01); *F21Y 2101/02* (2013.01)

(58) Field of Classification Search

CPC ..... H01L 33/642; H01L 33/64; H01L 51/529; H01L 2933/0075; F21V 29/004; F21V 3/00; F21V 15/011; F21V 7/20; F21V 3/005; F21V 11/14; F21V 29/00; F21V 1/00; F21V 29/002; F21V 33/0092; F21V 1/14; F21V 15/01; F21V 21/30; F21V 19/001; F21V 3/02; F21V 15/013; F21S 48/1233; F21Y 2101/02; F21Y 2105/001; F21Y 2103/003; F21Y 2103/00; F21Y 2113/005; F21Y 2103/022; F21Y 2111/005; F21Y 2113/00; F21Y 2111/007; F21Y 2111/001; F21Y 2113/02; F21Y 2105/00; F21Y 2103/025; F21Y 2111/004; F21Y 2105/003; F21Y 2111/002; F21Y 2113/002; F21Y 2101/00; F21Y 2111/00; F21Y 2111/008; F21Y 2103/02; F21Y 2113/007; F21Y 2105/005

See application file for complete search history.

(56) References Cited

U.S. PATENT DOCUMENTS

| | | | | |
|---|---|---|---|---|
| 2010/0061098 | A1* | 3/2010 | Horng et al. | 362/253 |
| 2011/0080726 | A1* | 4/2011 | Zhang et al. | 362/235 |
| 2011/0181165 | A1* | 7/2011 | Lin et al. | 313/46 |
| 2013/0223077 | A1* | 8/2013 | Kato et al. | 362/294 |

FOREIGN PATENT DOCUMENTS

| | | | |
|---|---|---|---|
| CN | 201599720 | U | 10/2010 |
| CN | 201836731 | U | 5/2011 |
| CN | 202040621 | U | 11/2011 |

* cited by examiner

*Primary Examiner* — Donald Raleigh

(74) *Attorney, Agent, or Firm* — Novak Druce Connolly Bove + Quigg LLP

(57) ABSTRACT

An LED lamp includes a base, a head connected to the base, an LED mounted on the base and a cover fixed on the base and covering the LED. The cover is made of metal and defines a plurality of through holes therein.

16 Claims, 7 Drawing Sheets

LED LAMP WITH COVER HAVING THROUGH HOLES

BACKGROUND

1. Technical Field

The disclosure generally relates to an light emitting diode (LED) lamp, and more particularly, to an LED lamp having a cover with a plurality of through holes.

2. Description of Related Art

Nowadays light emitting diodes (LEDs) are used widely in various applications for illumination. A typical LED lamp includes a base, an LED mounted on the base and a cover fixed on the base. The cover is often made of transparent material such as glass or plastic. The cover seals the LEDs within the lamp to protect the LEDs from the outside environment. However, the LEDs generate a large amount of heat during operation. The heat cannot be efficiently dissipated to the outside environment due to obstruction of the cover. Therefore, operation of the LEDs may be affected by the heat accumulated within the cover.

What is needed, therefore, is an LED lamp with a cover having through holes which can address the shortcomings as described above.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, like reference numerals designate corresponding parts throughout the various views.

DETAILED DESCRIPTION

Figure 1:
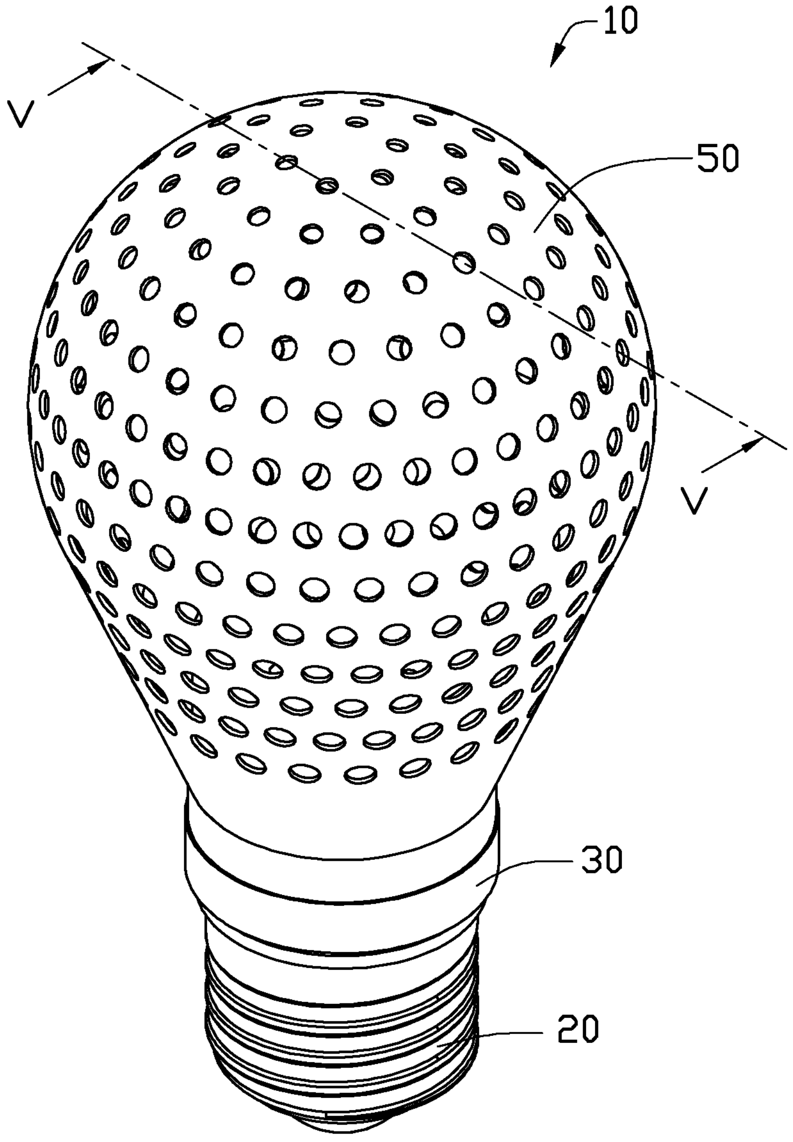
FIG. 1 is an isometric view of an LED lamp in accordance with an embodiment of the present disclosure.
Figure 2:
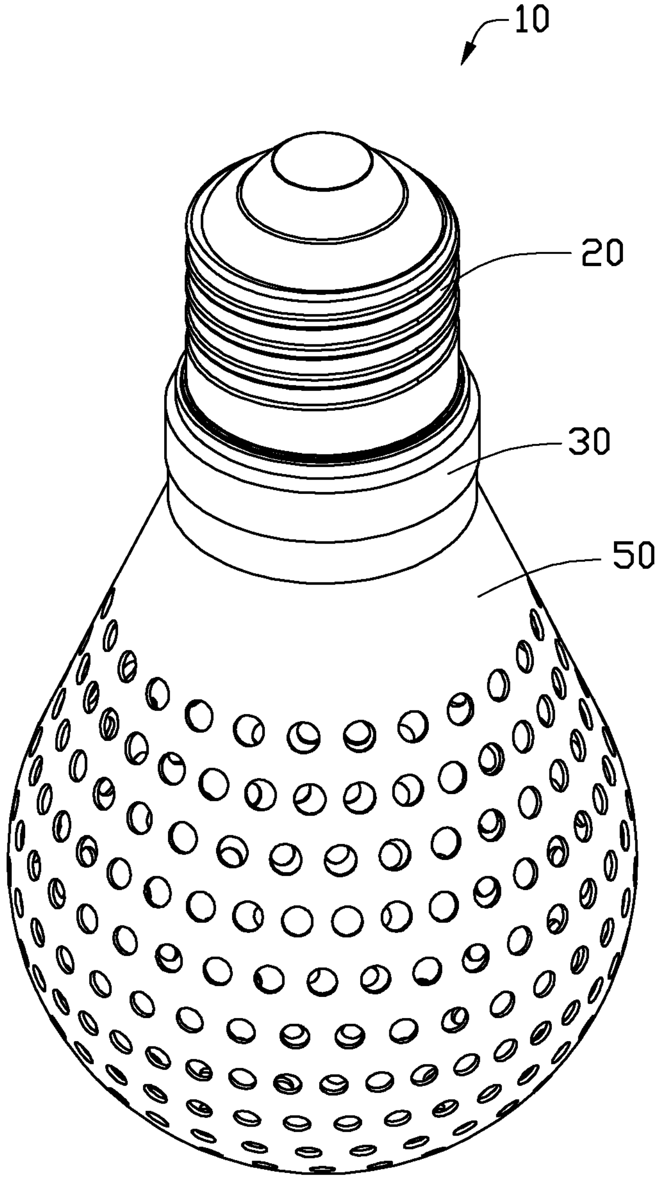
FIG. 2 is an inverted view of the LED lamp of FIG. 1.

Referring to FIGS. 1-2, an LED lamp 10 in accordance with an embodiment of the present disclosure is shown. The LED lamp 10 includes a head 20, a base 30 mounted on the head 20, a light source 40 (FIG. 5) disposed on the base 30 and a cover 50 fixed on the base 30.

Figure 3:
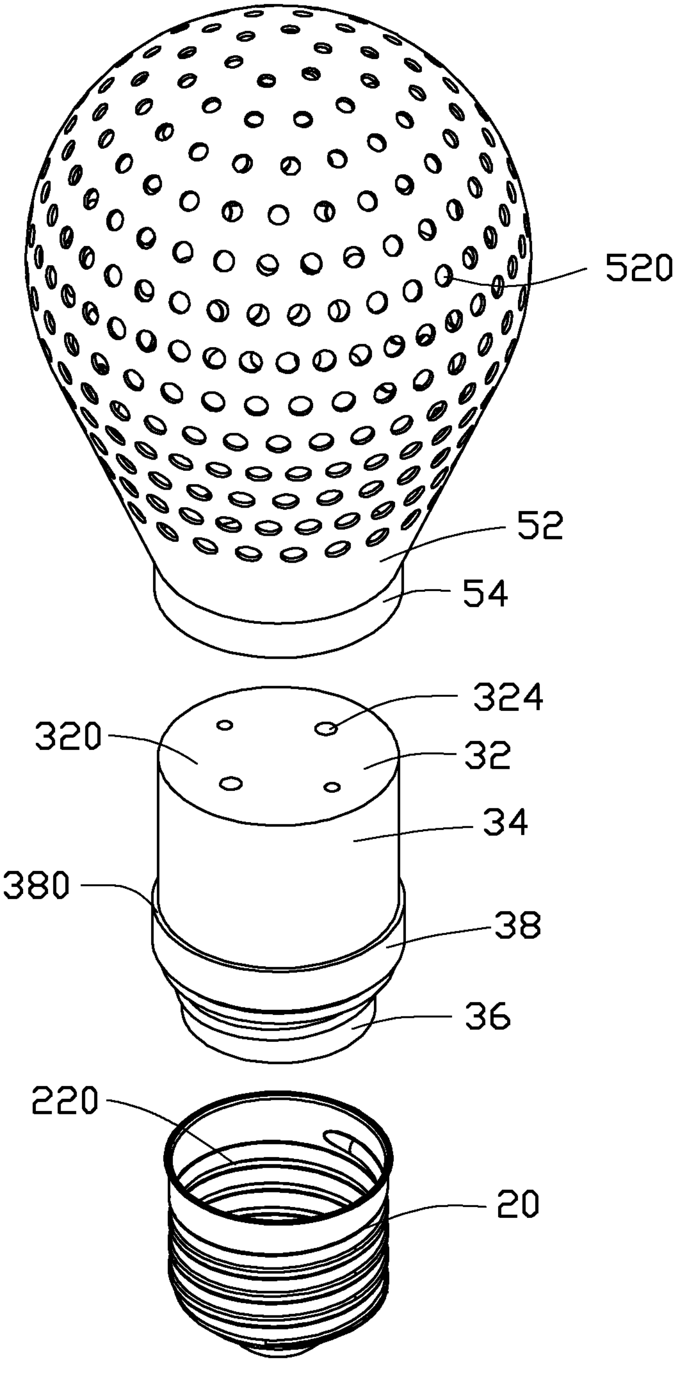
FIG. 3 is an exploded view of the LED lamp of FIG. 1, wherein a light source of the LED lamp is removed for clarity.
Figure 4:
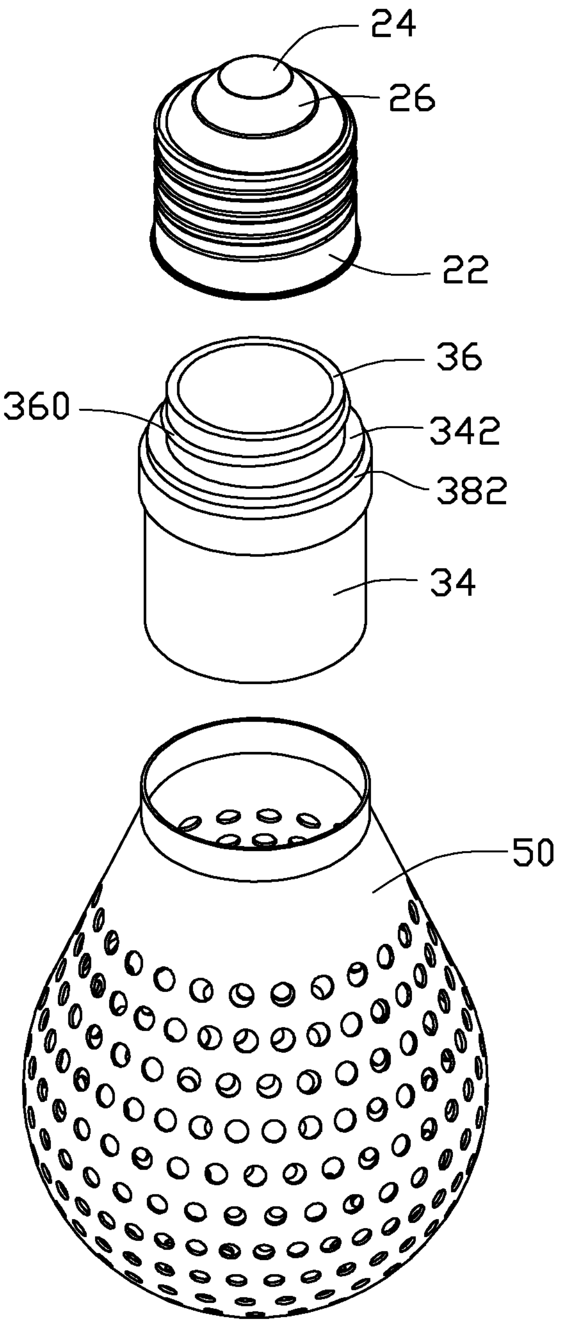
FIG. 4 is an inverted view of the LED lamp of FIG. 3.
Figure 5:
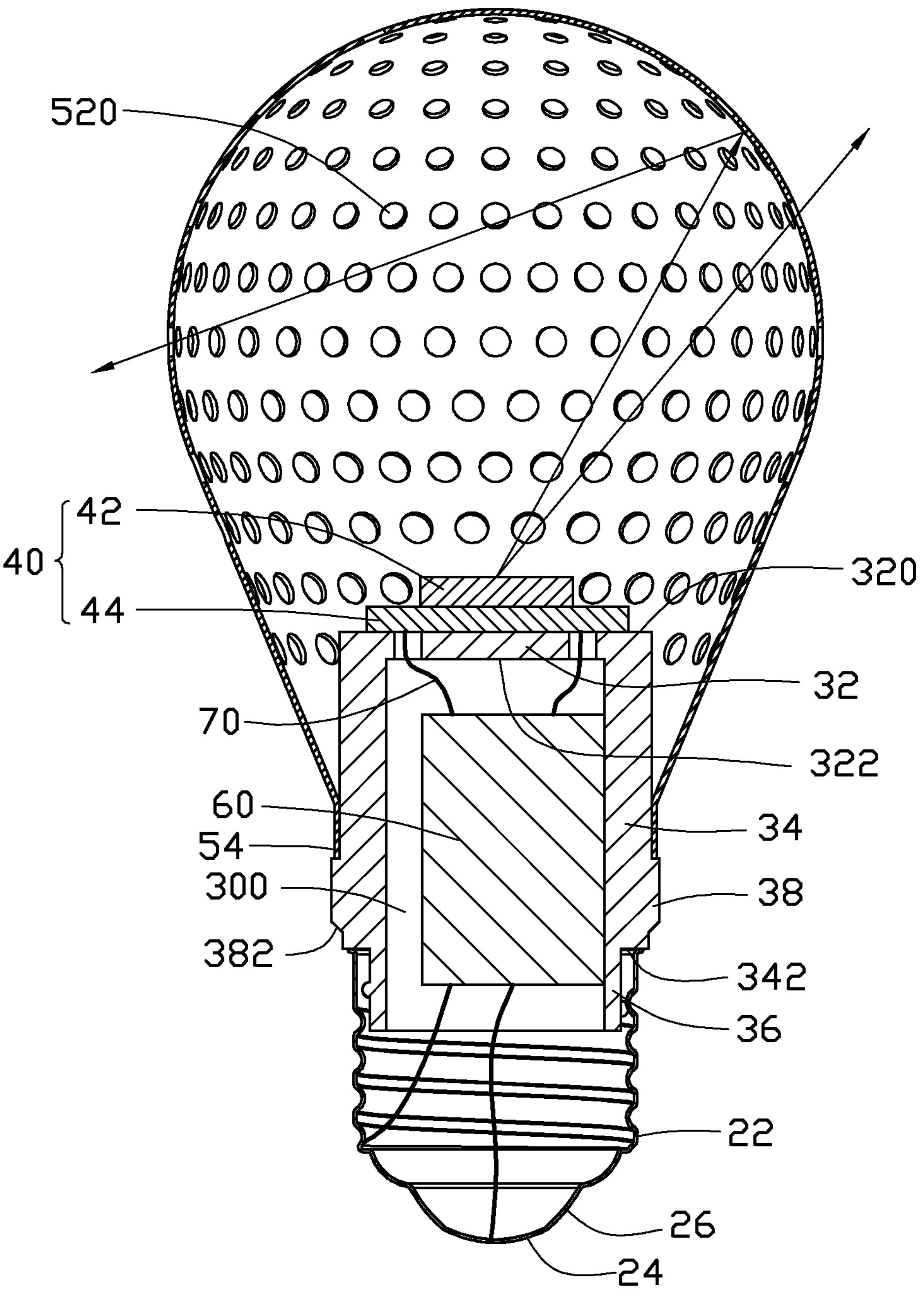
FIG. 5 is a cross sectional view of the LED lamp of FIG. 1, taken along line V-V thereof.

Also referring to FIGS. 3-5, the base 30 is made of heat conductive and electrical insulative material such as ceramic. The base 30 includes a plate 32, a sleeve 34 extending downwardly from an outer periphery of the plate 32 and a ring 36 connected to a bottom end of the sleeve 34. The plate 32 is circular and defines four circular holes 324 therein. The circular holes 324 are distributed adjacent to the outer periphery of the plate 32. Each circular hole 324 extends from a top face 320 to a bottom face 322 of the plate 32. The sleeve 34 is perpendicular to the plate 32. The sleeve 34 has a height larger than that of the plate 32. An annular protrusion 38 is formed on an outer circumferential face of the sleeve 34. The protrusion 38 is located at the bottom end of the sleeve 34. The protrusion 38 has a flat top face 380 parallel to the plate 32 and an inclined bottom face 382. Both of the top face 380 and the bottom face 382 of the protrusion 38 directly connect the outer circumferential face of the sleeve 34. A diameter of the inclined bottom face 382 of the protrusion 38 gradually decreases from an outer circumferential face of the protrusion 38 towards the bottom of the sleeve 34. The ring 36 connects the bottom of the sleeve 34. The ring 36 has an outer diameter less than that of the sleeve 34, and an inner diameter identical to that of the sleeve 34. An outer thread 360 is formed on an outer circumferential face of the ring 36. The ring 36, the sleeve 34 and the plate 32 cooperatively enclose a chamber 300 within the base 30. A drive module 60 is received in the chamber 300 for supplying power to the light source 40.

The light source 40 includes a circuit board 44 and an LED (light emitting diode) 42 mounted on the circuit board 44. The circuit board 44 is fixed on the top face 320 of the plate 32 of the base 30. Two wires 70 extend from the drive module 60 through two circular holes 324 to connect the circuit board 44. The LED 42 can be activated by the drive module 60 to emit light.

The cover 50 is made of metal such as aluminum, copper or an alloy thereof. The cover 50 includes a housing 52 and a flange 54 formed on a bottom of the housing 52. An upper portion of the housing 52 is hemispherical, and a lower portion of the housing 52 is conical, whereby the housing 52 has a bulb-shaped configuration. The lower portion of the housing 52 gradually shrinks from the upper portion towards the flange 54. A reflective film (not visible) may be formed on an inner face of the cover 50. A plurality of circular through holes 520 are uniformly defined in the housing 52. The through holes 520 are arranged in multiple rows along a top-to-bottom direction of the housing 52. A number of the through holes 520 firstly increases and then decreases from a top row towards a bottom row of the through holes 520. The through holes 520 are nearly arranged at the whole housing 52 except a part neighboring the bottom of the housing 52. The flange 54 extends downwardly from the bottom of the housing 52. The flange 54 has an inner diameter larger than the outer diameter of the sleeve 34, and less than an outer diameter of the protrusion 38. The cover 50 is assembled to the base 30 in a manner that a bottom of the flange 54 contacts the top face 380 of the protrusion 38, and an inner circumferential face of the flange 54 interferingly abuts against the outer circumferential face of the sleeve 34. In other words, the cover 50 is fixed to the base 30 by an interferential engagement therebetween. Thus, the cover 50 can be conveniently assembled to the base 30 by inserting the base 30 to the cover 50, and detached from the base 30 by pulling the base 30 out of the cover 50.

Figure 6:
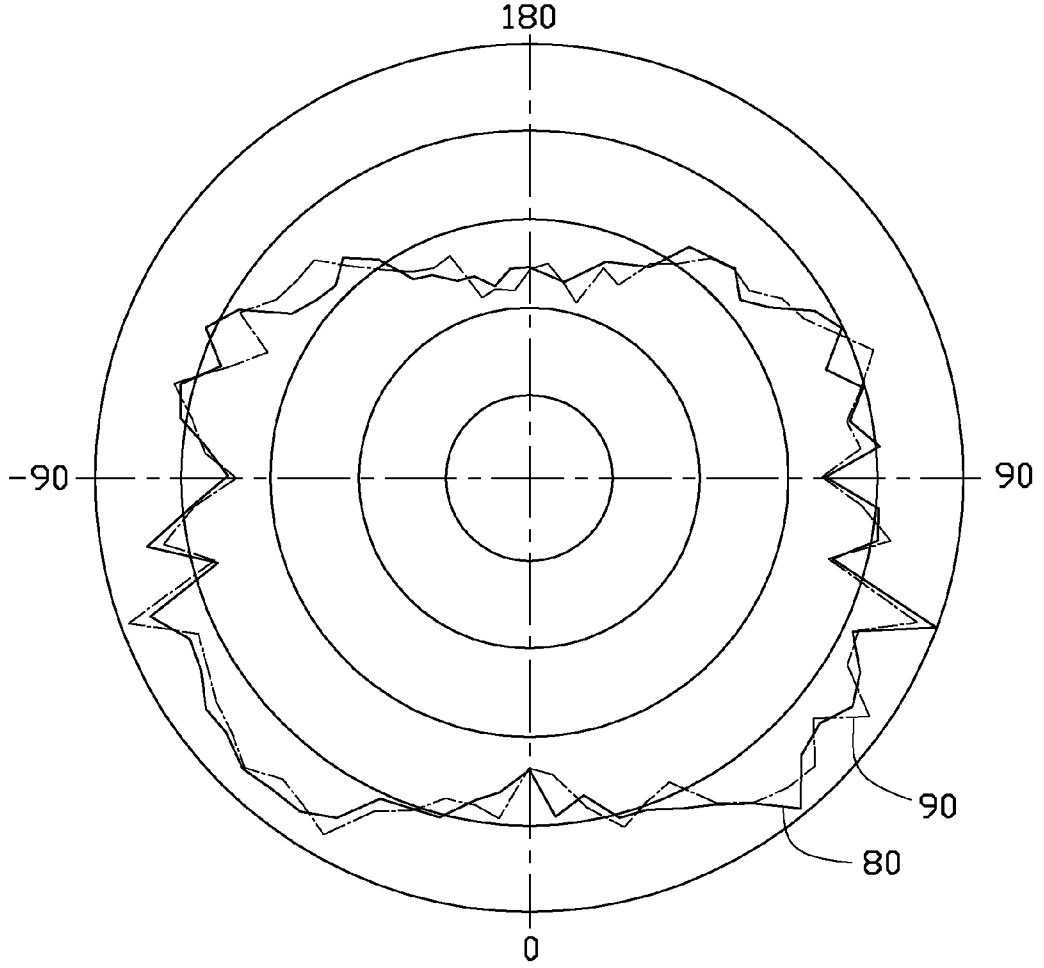
FIG. 6 shows light distribution curves of the LED lamp of FIG. 1 in two perpendicular planes.
Figure 7:
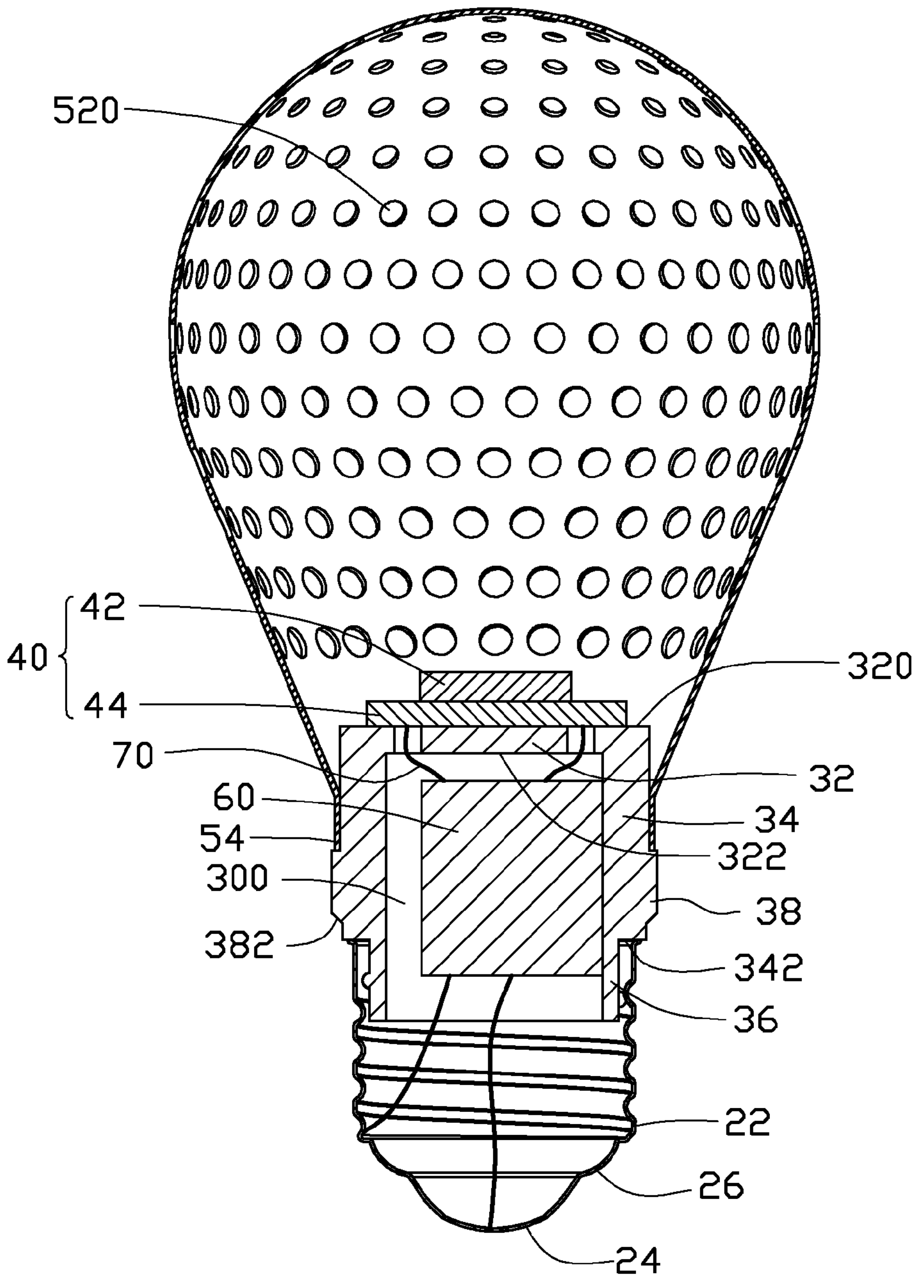
FIG. 7 is similar to FIG. 5, but showing the light source of the LED lamp of FIG. 7 at a position lower than that of FIG. 5.

After the cover 50 is assembled to the base 30, the LED 42 is located at a position higher than the bottom row of the through holes 520, and flush with the row of the through holes 520 just above and neighboring the bottom row of the through holes 520. Thus, the LED 42 is visible from the penultimate row of the through holes 520 of the cover 50. However, as shown in FIG. 7, the LED 42 may also be located lower than the bottom row of the through holes 520 in order to prevent direct visibility of the LED 42 from the through holes 520. A part of light emitted from the LED 42 directly passes through the through holes 520 to an outside environment, and another part of light emitted from the LED 42 is reflected by the inner face of the cover 50 and then transmits to the outside environment through the through holes 520. Since the through holes 520 are nearly distributed over the whole housing 52 of the cover 50, the light emergent out of the cover 50 can obtain a wide angle of illumination which is approximate to 360 degrees. Furthermore, the uniform arrangement of the through holes 520 also makes the light emitted out of the through holes 520 to distribute uniformly. FIG. 6 shows two light distribution curves 80, 90 of the LED lamp 10 measured in two perpendicular planes, which are nearly identical to each other.

When the LED 42 is activated to emit light, heat is also generated. Since the through holes 520 are defined in the cover 50, heat can be directly connected to the outside environment through the through holes 520. Furthermore, heat can also be conducted to the base 30, which further dissipates the heat to the outside environment. In addition, the metal cover 50 also efficiently assists the base 30 to dissipate heat to the outside environment due to a high heat conductivity thereof. Thus, the heat generated by the LED 42 can be rapidly and sufficiently removed from the LED lamp 10, and normal operation of the LED lamp 10 is ensured.

The head 20 can match with a typical bulb socket. The head 20 can be an E27 male screw base. The head 20 includes a wall 22, a connection tip 24 and an insulative band 26 interconnecting the wall 22 and the connection tip 24. The wall 22 and the connection tip 24 are both made of electrically conductive material such as metal. The wall 22 forms an inner thread 220 on an inner circumferential face thereof. The wall 22 is mounted on the ring 36 of the base 30 by interferingly engaging the inner thread 220 thereof with the outer thread 360 of the ring 36. The insulative band 26 surrounds the connection tip 24. A wire 70 connects the wall 22 with the drive module 60, and another wire 70 connects the connection tip 24 with the drive module 70. Thus, the drive module 60 is electrically connected to the head 20. Power from the typical bulb socket can be delivered to the drive module 60 via the head 20.

It is to be understood, however, that even though numerous characteristics and advantages of the present embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. An LED (light emitting diode) lamp comprising:

a head;

a base connected to the head;

an LED mounted on the base; and a cover fixed on the base and covering the LED, the cover defining a plurality of through holes therein;

wherein the through holes are arranged in a plurality of rows along a height direction of the cover, and a number of the through holes firstly increases and then decreases from a top row towards a bottom row of the through holes.

2. The LED lamp of claim 1, wherein the cover is made of opaque material.

3. The LED lamp of claim 1, wherein the cover is made of metal.

4. The LED lamp of claim 1, wherein the LED is located lower than a bottom row of the through holes.

5. The LED lamp of claim 1, wherein each of the through holes is circular.

6. The LED lamp of claim 1, wherein the cover comprises a housing and a flange extending downwardly from the housing, the through holes being defined in the housing.

7. The LED lamp of claim 6, wherein the housing comprises a hemispherical upper portion and a conical lower portion, the lower portion gradually expanding from the flange towards the upper portion of the housing.

8. The LED lamp of claim 6, wherein the base comprises a plate supporting the LED and a sleeve extending downwardly from the plate, the flange of the cover surrounding an outer circumferential face of the sleeve.

9. The LED lamp of claim 8, wherein an inner circumferential face of the flange interferingly abuts against the outer circumferential face of the sleeve.

10. The LED lamp of claim 8, wherein the base further comprises an annular protrusion formed on the outer circumferential face of the sleeve, a bottom of the flange abutting against a top face of the annular protrusion.

11. The LED lamp of claim 10, wherein the top face of the annular protrusion is parallel to the plate, the annular protrusion has an inclined bottom face directly connecting the outer circumferential face of the sleeve.

12. The LED lamp of claim 8, wherein the base further comprises a ring formed on a bottom of the sleeve, the ring being inserted to the head.

13. The LED lamp of claim 12, wherein the ring, the sleeve and the plate cooperative enclose a chamber in the base, a drive module being received in the chamber.

14. The LED lamp of claim 12, wherein the head comprises a wall, a connecting tip and an insulative band interconnecting the wall and the connection tip, the wall of the head surrounding the ring of the base.

15. The LED lamp of claim 14, wherein an outer thread is formed on an outer circumferential face of the ring of the base, and an inner thread is formed on an inner circumferential face of the wall of the head, the outer thread interferingly engaging with the inner thread.

16. The LED lamp of claim 1, wherein the LED lamp is an LED light bulb.

* * * * *